(12) United States Patent
Patil et al.

(10) Patent No.: US 8,149,770 B2
(45) Date of Patent: Apr. 3, 2012

(54) METHOD AND APPARATUS FOR DETERMINING CAPABILITY OF A SERVING SYSTEM FOR ANCHORING A CALL USING AN INTELLIGENT NETWORK PROTOCOL

(75) Inventors: Sudhakar R. Patil, Lake Zurich, IL (US); Mark Delsesto, Hudson, NH (US); Shivakumar Venkataraman, Bangalore, IN (US)

(73) Assignee: Motorola Mobility, Inc., Libertyville, IL (US)

( * ) Notice: Subject to any disclaimer, the term of this patent is extended or adjusted under 35 U.S.C. 154(b) by 355 days.

(21) Appl. No.: 12/602,876

(22) PCT Filed: Jun. 26, 2008

(86) PCT No.: PCT/US2008/068329
§ 371 (c)(1),
(2), (4) Date: Dec. 3, 2009

(87) PCT Pub. No.: WO2009/006196
PCT Pub. Date: Jan. 8, 2009

(65) Prior Publication Data
US 2010/0177691 A1 Jul. 15, 2010

(30) Foreign Application Priority Data
Jul. 5, 2007 (IN) .......................... 1432/DEL/2007

(51) Int. Cl.
*H04W 80/00* (2009.01)
*H04W 36/00* (2009.01)
(52) U.S. Cl. ................. 370/328; 455/432.1; 379/221.08
(58) Field of Classification Search .................. 370/328, 370/329, 331, 338, 401, 465; 455/432.1, 455/461; 379/221.08
See application file for complete search history.

(56) References Cited

U.S. PATENT DOCUMENTS

| | | | |
|---|---|---|---|
| 6,466,790 B2 | 10/2002 | Haumont et al. | |
| 6,633,555 B1 | 10/2003 | Lu et al. | |
| 2002/0049065 A1* | 4/2002 | Wallenius | 455/461 |
| 2003/0138092 A1* | 7/2003 | Maekiniemi et al. | 379/220.01 |
| 2004/0242226 A1* | 12/2004 | Bot et al. | 455/432.1 |
| 2006/0135160 A1* | 6/2006 | Jiang | 455/435.1 |
| 2007/0055995 A1* | 3/2007 | Jiang | 725/62 |
| 2007/0100981 A1 | 5/2007 | Adamczyk et al. | |
| 2007/0115908 A1* | 5/2007 | Wallenius et al. | 370/338 |
| 2007/0117573 A1 | 5/2007 | Kennedy, Jr. et al. | |
| 2007/0127683 A1* | 6/2007 | Zabawskyj et al. | 379/221.08 |
| 2007/0155382 A1* | 7/2007 | Jiang | 455/433 |

OTHER PUBLICATIONS

3GPP TR 23.806 v7.0.0 (Dec. 2005), 3rd Generation Partnership Project; Technical Specification Group Services and System Aspects; Voice Call Continuity between CS and IMS Study (Release 7), all pages.

* cited by examiner

*Primary Examiner* — Brian D Nguyen

(57) ABSTRACT

A method (200) for determining capability of a serving system for anchoring a call using an intelligent network protocol is provided. A communication network (100) includes a plurality of serving systems. Each serving system of the plurality of serving systems is associated with a unique identifier (ID). The method at a communication device (124) includes detecting (204) a movement of the communication device from a first serving system (102) to a second serving system (104) based on the unique ID of the first serving system and the unique ID of the second serving system. Further, the method includes accessing (206) a list that includes a mapping of the unique ID of each serving system with the intelligent network protocol capability of the serving system. Furthermore, the method includes determining (208), based on the list, whether the second serving system supports the intelligent network protocol for anchoring a call.

13 Claims, 3 Drawing Sheets

METHOD AND APPARATUS FOR DETERMINING CAPABILITY OF A SERVING SYSTEM FOR ANCHORING A CALL USING AN INTELLIGENT NETWORK PROTOCOL

FIELD OF THE INVENTION

This invention relates in general to communications, and more specifically, to a method and system for determining a capability of a serving system for anchoring a call using an intelligent network protocol.

BACKGROUND OF THE INVENTION

Communication devices such as mobile phones, cellular phones, laptops, Personal Digital Assistants (PDAs), and messaging devices have become a part of everyone's life these days. As a result, everyone wants their communication devices to work at all times and at all destinations, even when they are moving from one destination to another. However, when a person moves, with his/her communication device, from one destination to another while communicating with some one, the communication gets disturbed. At times the communication also drops when the person moves from one destination to another.

One of the reasons for disturbance in the communication is difference in protocols used by different serving systems and network devices such as Base Transceiver Stations (BTS) and Mobile Switching Centres (MSC) to anchor communication when the person moves from a destination in a cellular domain to another destination in packet domain, for example, an IP Multimedia Subsystem (IMS) domain. Another reason can be lack of knowledge at the communication device regarding the protocols used by different network devices to anchor the communication.

In light of the above, there is a need for a method and system for determining capability of a serving system for an intelligent network protocol capability. Further, the method and system should also be able to direct serving systems regarding which protocols to use for anchoring the communication.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
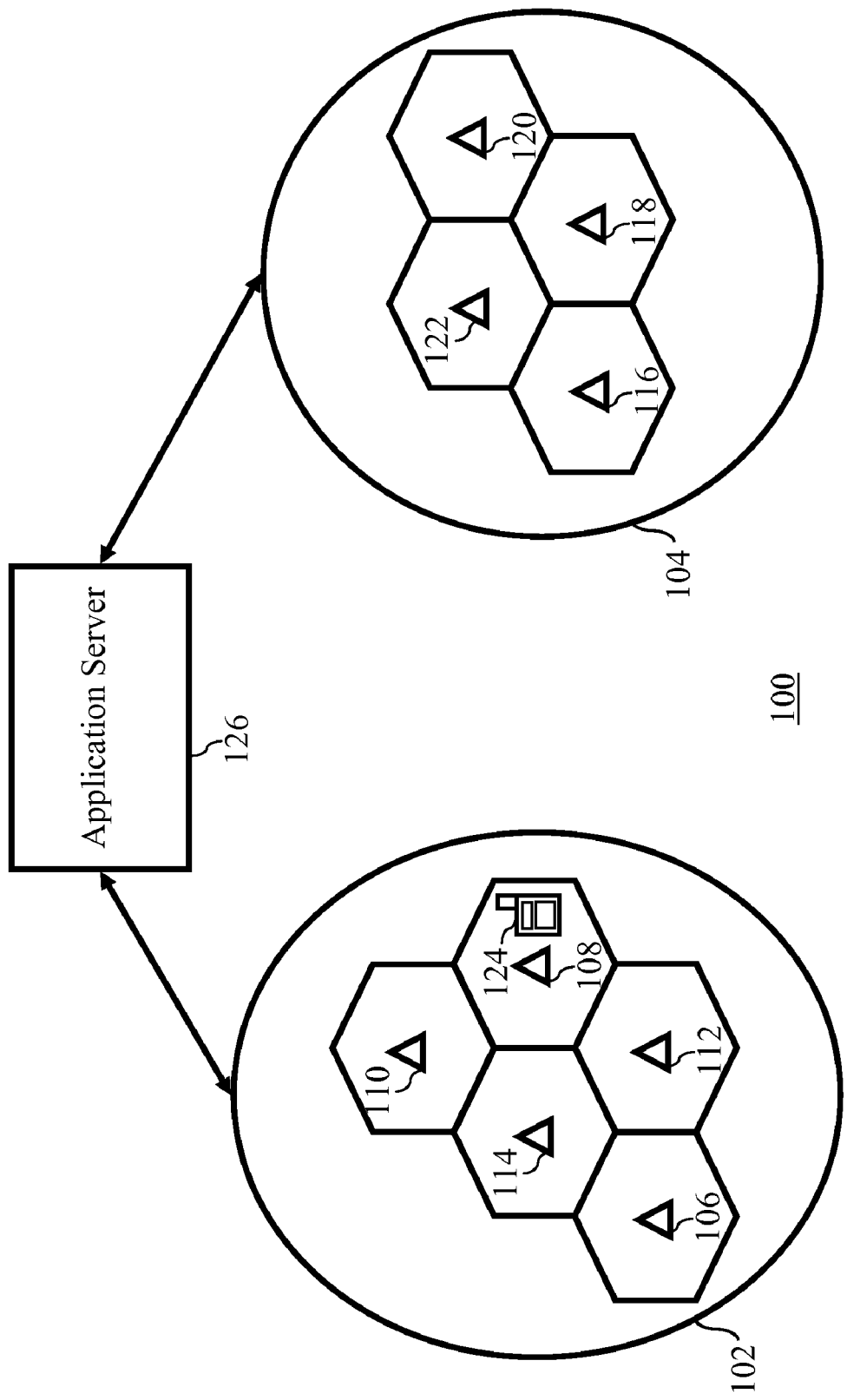
FIG. 1 illustrates an exemplary communication network where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

For one embodiment, a method for determining capability of a serving system for an intelligent network protocol capability for anchoring a call at an application server in a communication network is provided. The communication network includes a plurality of serving systems. Each serving system of the plurality of serving systems is associated with a unique identifier (ID). The method at a communication device includes detecting a movement of the communication device from a first serving system of the plurality of serving systems to a second serving system of the plurality of serving systems based on the unique ID of the first serving system and the unique ID of the second serving system. Further, the method includes accessing a list stored at the communication device. The list includes a mapping of the unique ID of each serving system of the plurality of serving systems with the capability of the serving system for anchoring the call using the intelligent network protocol. Further, the method includes determining, based on the list, whether the second serving system supports anchoring the call using the intelligent network protocol.

For another embodiment, a communication device is provided that is capable of operating in a communication network that includes a plurality of serving systems. Each serving system of the plurality of serving systems is associated with a unique identifier (ID). The communication device includes a memory configured to store a list including a mapping of the unique ID of each of the plurality of serving systems with an intelligent network protocol capability for anchoring a call at an application server for each of the plurality of serving systems. Further, the communication device includes a detector configured to detect the movement of the communication device from a first serving system of the plurality of serving systems to a second serving system of the plurality of serving systems based on the unique ID of the first serving system and the unique ID of the second serving system. Further, the communication device includes a processor configured to access the list stored at the memory. The processor is further configured to determine, based on the list, whether the second serving system supports anchoring the call using the intelligent network protocol.

Before describing in detail the particular method and system for determining capability of a serving system for anchoring a call using an intelligent network protocol, in accordance with various embodiments of the present invention, it should be observed that the present invention utilizes a combination of method steps and apparatus components that are related to the method and system for determining capability of a serving system for anchoring a call using an intelligent network protocol. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' 'including,' or any other variation thereof, are intended to cover a non-exclusive inclusion, such that a process, article, system or apparatus that comprises a list of elements does not include only those elements but may include other elements not expressly listed or inherent to such process, article or apparatus. An element preceded by 'comprises... a' does not, without more constraints, preclude the existence of additional identical elements in the process, article, system or apparatus that comprises the element. The terms 'includes' and/or 'having,' as used herein, are defined as comprising.

The term 'another,' as used in this document, is defined as at least a second or more. The term 'includes,' as used herein, is defined as comprising.

FIG. 1 illustrates an exemplary communication network 100 where various embodiments of the present invention can be practiced. Examples of the communication network 100 can include, but are not limited to, Internet Protocol Multimedia Subsystem (IMS) networks, IEEE 802.16-based broadband wireless access networks, Advanced Mobile Phone Systems (AMPS) networks, Global System for Mobile Communications (GSM) networks, Digital Cellular Systems (DCS) networks, Code Division Multiple Access (CDMA) networks, Integrated Digital Enhanced Network (iDEN), and Universal Mobile Telecommunication Systems (UMTS) networks.

The communication network 100 includes a plurality of serving systems 102, 104 (two shown). Each serving system of the plurality of serving systems can be a geographical area, such as a country, city, town and the like, covered by the communication network 100. Further, each serving system of the plurality of serving systems is associated with a unique identifier (ID). For one embodiment, the unique ID associated with each serving system can be a combination of a System ID (SID) and Network ID (NID) of the serving system. For another embodiment, the unique ID associated with each serving system can be a combination of a Mobile Country Code (MCC) and a Mobile Network Code (MNC) of the serving system.

Further, each serving system of the plurality of serving systems 102, 104 can include one or more network devices. Examples of the one or more network devices include, but are not limited to, a Base Transceiver Station (BTS) and a Mobile Switching Center (MSC). For example, a serving system can be a city and can include one or more BTSs covering the city. For the purpose of illustrating the principles of the present invention, and not intended to limit the invention in any way, the plurality of serving systems 102, 104 is shown to include a first serving system 102 and a second serving system 104. The first serving system 102 includes multiple network devices 106, 108, 110, 112, and 114 (five shown). The second serving system 104 also includes multiple network devices 116, 118, 120, and 122 (four shown).

Further, the communication network 100 includes an application server 126. The application server 126 can host and execute services such as Voice Call Continuity (VCC) service, Short Message Service (SMS), Multimedia Message Service (MMS), location-based service, voice mail service, and Push-To-Talk (PTT) service among others. The communication network 100 also includes a communication device 124. The communication device 124 helps a user of the communication device 124 to communicate with other communication devices in the communication network 100. Examples of the communication device 124 can include, but are not limited to, cellular phones, laptops and Personal Digital Assistants (PDAs) with wireless communications capabilities, and messaging devices.

For sake of explaining the current invention, the communication device 124 moves from the first serving system 102 to the second serving system 104 in the communication network 100. For one embodiment, the communication device 124 can be involved in a call with another communication device in the communication network 100, while moving from the first serving system 102 to the second serving system 104. For another embodiment, the communication device 124 can make a call to another communication device after camping at the second serving system 104.

As the user of the communication device 124 moves from the first serving system 102 to the second serving system 104, the communication device 124 detects the movement from the first serving system 102 to the second serving system 104 based on the unique ID of the first serving system 102 and the unique ID of the second serving system 104. After detecting the movement, the communication device 124 accesses a list stored at the communication device 124. The list stored at the communication device 124 includes a mapping of the unique ID of each serving system of the plurality of serving systems in the communication network 100 with the capability of the serving system for anchoring the call using an intelligent network protocol. For example, the intelligent network protocol may be a Wireless Intelligent Network (WIN) protocol in a case of a CDMA network and may be a Customized Application for Mobile network Enhanced Logic (CAMEL) protocol in a case of a GSM network.

The communication device 124 determines whether the second serving system 104 supports anchoring the call using the intelligent network protocol based on the list stored at the communication device 124. Call anchoring is known in the art and is described in 3GPP (Third Generation Partnership Project) TS (Technical Specification) 23.806, "Voice Call Continuity between CS and IMS Study (Release 7)," which Technical Specification is hereby incorporated by reference herein. In case the list indicates that the second serving system 104 supports the intelligent network protocol to anchor the call, the communication device 124 makes a normal call, thus directing the second serving system 104 to use the intelligent network protocol for anchoring/routing the call. In some scenarios, anchoring the call may include anchoring the call on an external application server and, more specifically, anchoring the call on an application server in the IMS domain. However, if the intelligent network protocol capability is not present in the list stored at the communication device 124, the communication device 124 uses any communication method such as Dual Transfer Mode (DTM), Dual Tone Multi Frequency (DTMF), Unstructured Supplementary Service Data (USSD), or any alternate method that does not rely on anchoring/routing the call using the intelligent network protocols.

Figure 2:
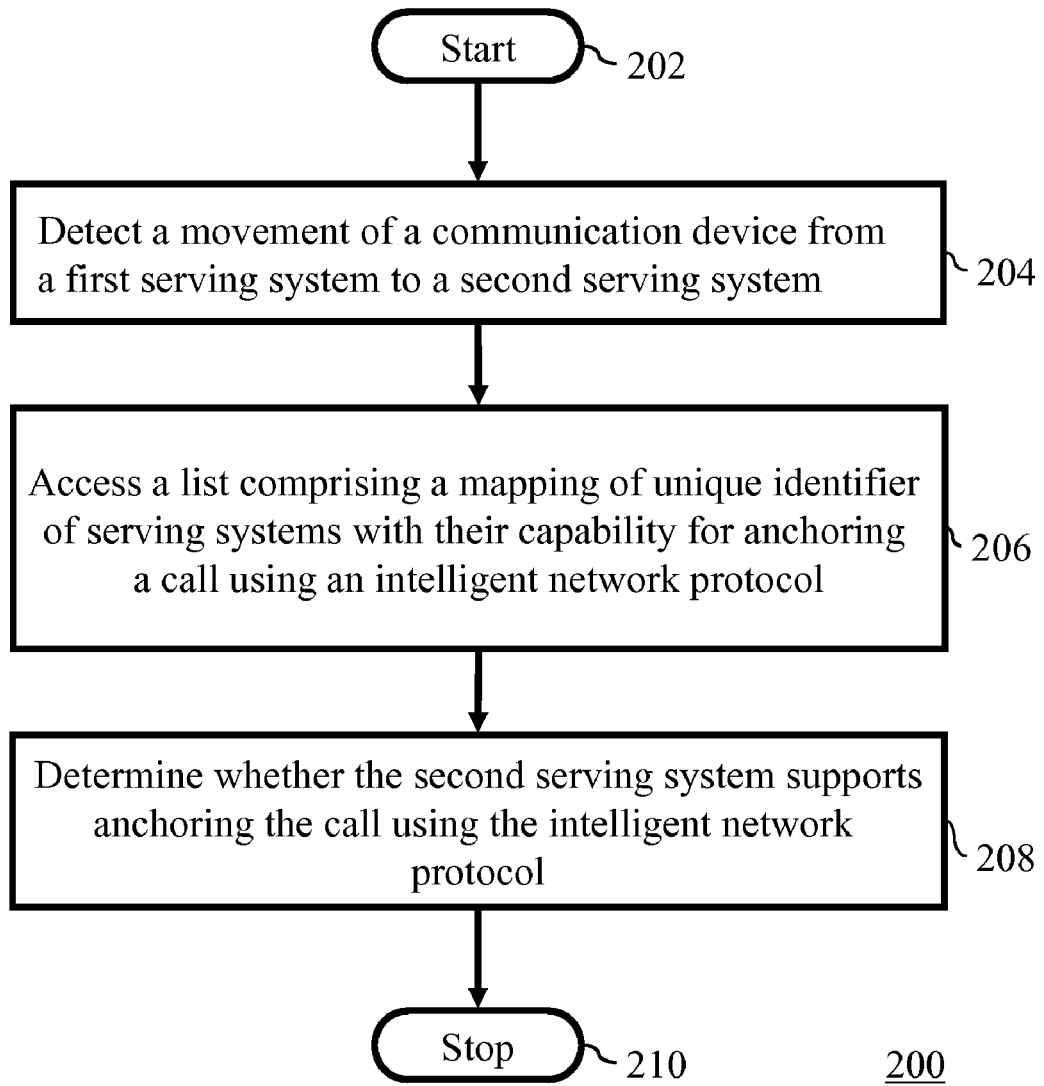
FIG. 2 is a logic flow diagram illustrating a method for determining capability of a serving system for an intelligent network protocol capability for anchoring a call at an application server in a communication network in accordance with various embodiments of the present invention.

Referring now to FIG. 2, a logic flow diagram is provided that illustrates a method 200 for determining capability of a serving system for the intelligent network protocol capability for anchoring a call at the application server 126 in a communication network 100 in accordance with various embodiments of the present invention. To describe the method 200, reference will be made to FIG. 1, although it is understood that the method 200 can be implemented in any other suitable environment or network. Moreover, the invention is not limited to the order in which the steps are listed in the method 200.

The method 200 is initiated at step 202. At step 204, the communication device 124 detects a movement of the communication device 124 from the first serving system 102 to the second serving system 104 based on the unique ID of the first serving system 102 and the unique ID of the second serving system 104. For example, consider a scenario in which the communication device 124 is present in a cell associated with the network device 108 of the first serving system 102. Further, the communication device 124 is in a call with another communication device in the communication network 100. When the communication device 124 moves from the cell associated with the network device 108 to a cell associated with the network device 122, the communication device 124 detects the movement of the communication device 124. The movement of the communication device 124 can be detected based on change in the serving system unique ID associated with the network device serving the communication device 124. For example, the communication device 124 may receive the unique ID of a serving system from a network device of the serving system in response to registering with, attempting to access, or otherwise receiving signaling from, the serving system. When the communication device 124 receives a serving system ID, the communication device stores the ID in a memory of the communication device and thus is able to detect a change in IDs by comparing IDs.

At step 206, based on the detection of movement of the communication device 124, the communication device 124 accesses a list stored at the communication device 124. The list includes a mapping of the unique ID of each serving system of the plurality of serving system 102, 104 in the communication network 100 with the capability of the serving system for anchoring the call using the intelligent network protocol. The intelligent network protocol can be a WIN protocol, a CAMEL protocol, and the like based on the type of the communication network 100. The list can be in form of a table mapping the serving systems and the network devices associated with the serving systems with their respective intelligent network protocol capabilities.

At step 208, the communication device 124 determines whether the second serving system 104 supports anchoring the call using the intelligent network protocol based on the list. The method then terminates at step 210. In case the second serving system 104 supports the intelligent network protocol to anchor the call according to the list, the communication device 124 makes a normal call and, in setting up the call, directs the second serving system 104 to use the intelligent network protocol for anchoring the call. For example, when the communication device 124 moves from the cell associated with the network device 108 to the cell associated with the network device 122, the communication device 124 accesses the list stored at the communication device 124. Based on the list, the communication device 124 determines whether the network device 122 associated with the second serving system 104 supports anchoring the call using the intelligent network protocol. In case the network device 122 supports the intelligent network protocol for anchoring the call, the communication device 124 directs the network device 122 to use the intelligent network protocol for anchoring the call.

However, if the intelligent network protocol capability is not present in the list stored at the communication device 124 or if the network device 122 does not supports anchoring the call using the intelligent network protocol, the communication device 124 uses any method that does not rely on anchoring/routing the call using the intelligent network protocols such as Dual Transfer Mode (DTM), Dual Tone Multi Frequency (DTMF), Unstructured Supplementary Service Data (USSD), and the like.

In case the intelligent network protocol capability of the second serving system 104 is not present in the list stored at the communication device 124, the communication device 124 may obtain the intelligent network protocol capabilities of the second serving system 104 from the application server 126. That is, the communication device 124 may initiate transfer of the second serving system's intelligent network protocol capabilities by placing a call to the application server at a predefined number or routing address. For example, the application server 126 may comprise a Call Continuity Control Function that determines the second serving system's intelligent network protocol capabilities by a sequence of messages that cause the call to reach the application server. In response to receiving the call, the application server 126 may retrieve the intelligent network protocol capabilities of the second serving system 104 from the second serving system, or may self-determine the second serving system's intelligent network protocol capabilities if application server stores such information in the server's own memory. In response to a query from the application server 126, the second serving system 104 may convey the serving system's intelligent network protocol capabilities to the application server 126 in an intelligent network protocol trigger message that can include information related to the capability of the second serving system 104 regarding the intelligent network protocol capability.

Based on the transfer of the intelligent network protocol trigger, the application server 126 may convey to the communication device 124, and the communication device may receive from the application server, a response that includes information related to the capability of the second serving system 104 to anchor the call using the intelligent network protocol. The response can also include a contact number of a called communication device in the communication network 100 and a time stamp associated with the call. Further, the response can be conveyed to the communication device 124 via a call back to the communication device or by using a Short Messaging Service (SMS) and a call-related parameter such as a Calling Party Number (CGPN). For example, when the communication device 124 makes a call using a method other than intelligent network protocols, the application server 126 receives an intelligent network protocol message/trigger from the second serving system 104. As a result, the application server 126 can send a message to the communication device 124 to indicate the capability of the second serving system 104 regarding the intelligent network protocol.

For one embodiment, the communication device 124 may populate the list stored at the communication device based on the response received from the application server 126. For another embodiment, the communication device 124 can make a dummy call to populate the list stored at the communication device 124. In this embodiment, the communication device 124 can make a dummy call to a predefined phone number or routing address associated with the application server whenever the communication device 124 detects a change in the serving system. As the communication device 124 moves from the first serving system 102 to the second serving system 104, the communication device 124 makes a call to the predefined number or routing address to obtain information regarding the intelligent network protocol capability. Based on response of the application server to the dummy call, the communication device 124 may populate the list.

Also, the communication device 124 may delete information related to capability of a serving system from the list stored at the communication device 124 based on the fact that the serving system has ceased to support intelligent network protocol for anchoring the calls. The information can be deleted using any method known in the art.

Also, the list stored at the communication device 124 can be pre-populated by a communication service provider providing service to the communication device 124. In this embodiment, the communication service provider can update the list based on the information processed by the communication service provider.

Figure 3:
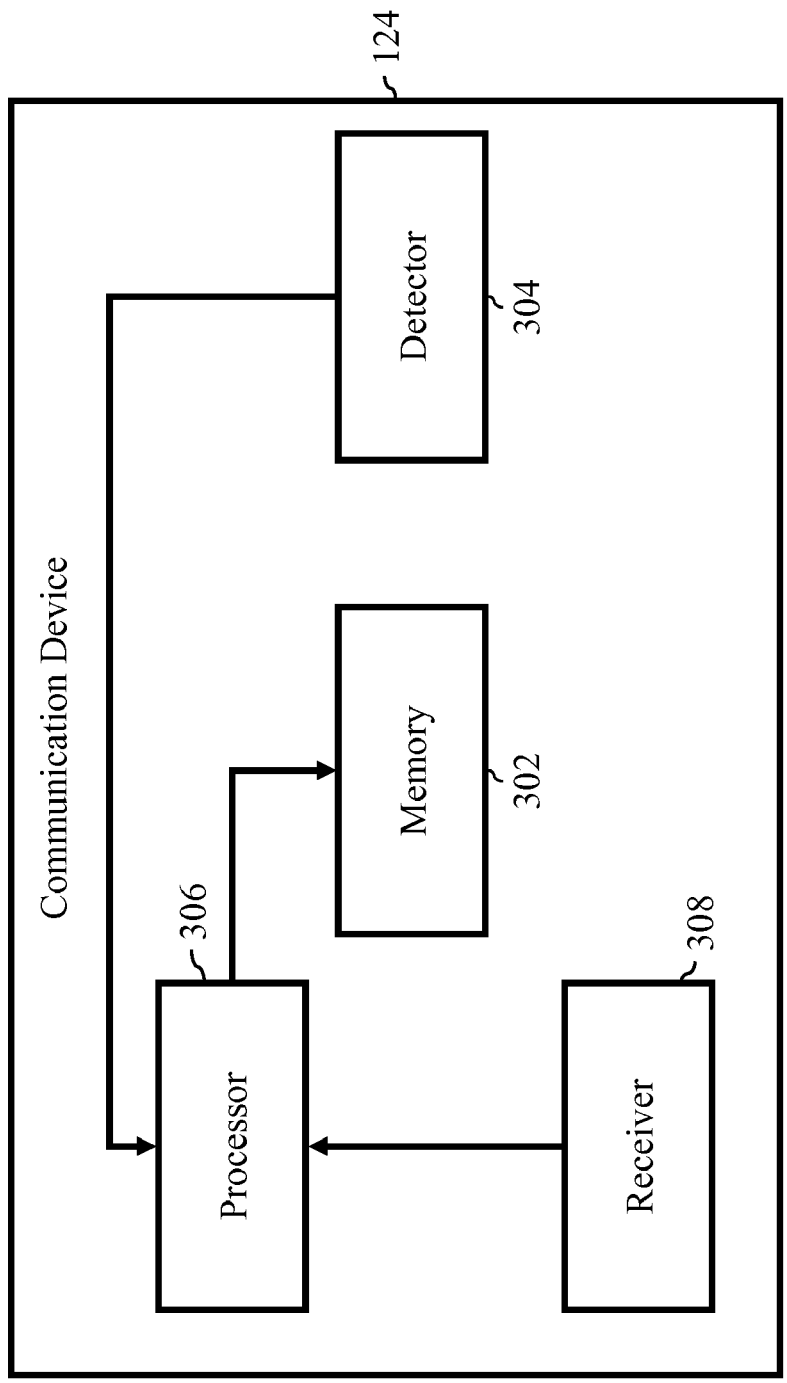
FIG. 3 illustrates a block diagram of a communication device in accordance with some embodiments of the present invention.

Referring now to FIG. 3, a block diagram is provided of the communication device 124 in accordance with some embodiments of the present invention. Those skilled in the art would appreciate that the communication device 124 may include all or additional number of components than those shown in FIG. 3. To describe the communication device 124, reference will be made to the FIG. 1, although it should be understood that the communication device 124 can be implemented in any other suitable embodiment.

The communication device 124 can include a processor 306 that is coupled to each of a memory 302, a detector 304, and a receiver 308. The memory 302 can be configured to store a list including a mapping of the unique ID of each of the plurality of serving systems 102, 104 with the intelligent network protocol, such as WIN or CAMEL, capability for anchoring a call at the application server 126 for each of the plurality of serving systems.

The detector 304 is configured to detect the movement of the communication device 124 in the communication network 100. The detector 304 can detect movement of the communication device 124 from the first serving system 102 to the second serving system 104 based on the unique ID of the first serving system 102 and the unique ID of the second serving system 104.

After the detector 304 has detected the movement of the communication device 124, the processor 306 can access the list stored at the memory 302. Further, the processor 306 determines whether the second serving system 104 supports anchoring the call using the intelligent network protocol based on the list. In case the processor 306 determines that the intelligent network protocol capability of the second serving system 104 is not present in the list stored at the communication device 124 or if the second serving system 104 does not support anchoring the call using the intelligent network protocol, the processor 306 uses any method to set up the call that does not rely on the availability of intelligent network protocol at the second serving system such as Dual Transfer Mode (DTM), Dual Tone Multi Frequency (DTMF), Unstructured Supplementary Service Data (USSD), and the like. In case the second serving system 104 supports the intelligent network protocol for anchoring the call, the processor 306 directs the second serving system 104 to use the intelligent network protocol for anchoring the call.

The processor 306 is further configured to initiate transfer of an intelligent network protocol trigger from the second serving system 104 to the application server 126. Based on the transfer of the intelligent network protocol trigger protocol, the receiver 308 is configured to receive a response from the application server 126. The response can include information related to the capability of the second serving system 104 to anchor the call using the intelligent network protocol. The response can also include the called party number as well as a time stamp of the call.

Based on the response received from the application server 126, the processor 306 is further configured to populate the list stored at the memory 302 with the information related to the capability of the second serving system 104 to anchor the call using the intelligent network protocol. The processor 306 can also populate the list based on a dummy call initiated by the communication device 124. For one embodiment, the dummy call can be initiated by the processor 306. In this embodiment, the processor 306 can make a call to a predefined application server, such as application server 126, using any one of DTMF, DTM, USSD, and the like. Routing information for the call, such as a predefined routing address or phone number associated with the predefined application server, may be stored in the memory 302 of the communication device 124. The call can be made as soon as the detector 304 detects the movement of the communication device 124 to the second serving system 104. Based on the call, the application server 126 can send a response to the communication device 124. The response can include information regarding the intelligent network protocol capability of the second serving system 104. The processor 306 also can delete information related to capability of a serving system from the list stored in the memory 302 based on the fact that the serving system has ceased to support intelligent network protocol for anchoring the calls.

Various embodiments, as described above, provide a method and system for determining capability of a serving system for an intelligent network protocol capability. The present invention improves the quality of the communication when the user is moving from one destination to another. Further, the present invention also improves the communication handoffs by anchoring the communication/call in the most optimal way. Since, the list stored at the communication device provides information regarding the capability of the serving systems for anchoring the call using intelligent network protocol, it helps in determining the protocol to be used for anchoring the call. As a result, the quality of the communication is improved.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of a method for determining capability of a serving system for an intelligent network protocol capability. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

What is claimed is:

1. A method for determining a capability of a serving system for anchoring a call at an application server using an intelligent network protocol, wherein a communication network comprises a plurality of serving systems and wherein each serving system of the plurality of serving systems is associated with a unique identifier (ID), the method at a communication device comprising:

detecting a movement of the communication device from a first serving system of the plurality of serving systems to a second serving system of the plurality of serving systems based on the unique ID associated with the first serving system and the unique ID associated with the second serving system;

accessing a list stored at the communication device, wherein the list comprises a mapping of the unique ID associated with each serving system of the plurality of serving systems with the capability of the serving system for anchoring the call using the intelligent network protocol; and based on the list, determining whether the second serving system supports anchoring the call using the intelligent network protocol.

2. The method as recited in claim 1, wherein the intelligent network protocol is one of a Wireless Intelligent Network (WIN) protocol and a Customized Application for Mobile network Enhanced Logic (CAMEL) protocol.

3. The method as recited in claim 1, wherein determining comprises determining that the second serving system supports the intelligent network protocol to anchor the call and wherein the method further comprises directing the second serving system to use the intelligent network protocol for anchoring the call.

4. The method as recited in claim 1 further comprising initiating a transfer of an intelligent network protocol trigger message from the second serving system to the application server.

5. The method as recited in claim 4 further comprising:

receiving a response from the application server based on the transfer of the intelligent network protocol trigger message from the second serving system to the application server; and populating the list stored at the communication device with information related to a capability of the second serving system to anchor a call using the intelligent network protocol based on the response received from the application server.

6. The method as recited in claim 1 further comprising populating the list stored at the communication device with information related to a capability of the second serving system to anchor a call using the intelligent network protocol based on a dummy call initiated by the communication device.

7. A communication device capable of operating in a communication network comprising a plurality of serving systems, wherein each serving system of the plurality of serving systems is associated with a unique identifier (ID), the communication device comprising:

a memory configured to store a list comprising a mapping of the unique ID associated with each of the plurality of serving systems with an intelligent network protocol capability for anchoring a call at an application server for each of the plurality of serving systems;

a detector configured to detect the movement of the communication device from a first serving system of the plurality of serving systems to a second serving system of the plurality of serving systems based on the unique ID associated with the first serving system and the unique ID associated with the second serving system; and a processor configured to:
  access the list stored at the memory; and
  determine, based on the list, whether the second serving system supports anchoring the call using the intelligent network protocol.

8. The communication device as recited in claim 7, wherein the intelligent network protocol is one of a Wireless Intelligent Network (WIN) protocol and Customized Application for Mobile network Enhanced Logic (CAMEL) protocol.

9. The communication device as recited in claim 7, wherein the processor is further configured to direct the second serving system to use the intelligent network protocol for anchoring the call when the processor determines that the second serving system supports the intelligent network protocol to anchor the call.

10. The communication device as recited in claim 7, wherein the processor is further configured to initiate transfer of an intelligent network protocol trigger message from the second serving system to the application server.

11. The communication device as recited in claim 10 further comprising a receiver configured to receive a response from the application server based on the transfer of the intelligent network protocol trigger message from the second serving system to the application server and wherein the processor is further configured to populate the list stored at the memory with information related to a capability of the second serving system to anchor a call using the intelligent network protocol based on the response received from the application server.

12. The communication device as recited in claim 7, wherein the processor is further configured to populate the list stored at the memory with information related to a capability of the second serving system to anchor a call using the intelligent network protocol based on a dummy call initiated by the communication device.

13. The communication device as recited in claim 7, wherein the list stored at the communication device is prepopulated by a communication service provider.

* * * * *